United States Patent [19]
Cutsinger

[11] Patent Number: 5,551,598
[45] Date of Patent: Sep. 3, 1996

[54] WATER RUN-ON TIMER

[75] Inventor: Thad J. Cutsinger, Fort Smith, Ark.

[73] Assignee: Whirlpool Corporation, Benton Harbor, Mich.

[21] Appl. No.: 301,081

[22] Filed: Sep. 6, 1994

[51] Int. Cl.$^6$ .................................................. B67D 5/08
[52] U.S. Cl. .......................... 222/52; 222/59; 222/640; 251/129.04; 137/624.2
[58] Field of Search .............................. 222/52, 59, 63, 222/16, 30, 32, 33–6, 40, 638, 639, 640, 641, 644, 646, 648, 23; 141/94, 360-2; 137/624.14, 624.15, 624.2; 251/129.04

[56] References Cited

U.S. PATENT DOCUMENTS

| | | | |
|---|---|---|---|
| 3,119,527 | 1/1964 | Dyer | 222/639 |
| 3,273,752 | 9/1966 | Horeczky | 222/639 |
| 3,461,907 | 8/1969 | Wood, Jr. | 251/129.04 |
| 3,493,951 | 2/1970 | Hartka et al. | 340/239 |
| 3,669,312 | 6/1972 | Kuckens et al. | 222/641 |
| 3,812,890 | 5/1974 | Haas et al. | 141/94 |
| 3,934,757 | 1/1976 | Malek et al. | 141/362 |
| 4,202,387 | 5/1980 | Upton | 141/360 |
| 4,225,057 | 9/1980 | Horn | 222/34 |
| 4,458,828 | 7/1984 | Allen et al. | 222/33 |
| 4,895,194 | 1/1990 | McCann et al. | 141/360 |
| 4,947,153 | 8/1990 | Berger | 340/608 |
| 4,953,751 | 9/1990 | Shannon | 222/641 |
| 5,038,972 | 8/1991 | Muderlak et al. | 222/36 |
| 5,050,641 | 9/1991 | Shwu-Fen | 251/129.04 |
| 5,063,622 | 11/1991 | Tsutsui et al. | 251/129.04 |
| 5,144,977 | 9/1992 | Eggerton et al. | 137/554 |
| 5,166,667 | 11/1992 | Jen | 340/606 |
| 5,173,178 | 12/1992 | Kawashima et al. | 251/129.04 |
| 5,184,642 | 2/1993 | Powell | 251/129.04 |
| 5,411,173 | 5/1995 | Weinstein | 222/32 |
| 5,431,302 | 7/1995 | Tulky et al. | 222/59 |

Primary Examiner—Andres Kashnikow
Assistant Examiner—Lisa Douglas
Attorney, Agent, or Firm—Thomas J. Roth; Mark A. Davis

[57] ABSTRACT

An apparatus for measuring and displaying a time interval between a valve closure and subsequent termination of a flow at a spigot is provided. The apparatus has magnetic sensors coupled to a flow regulating valve for providing a signal indicative of a solenoid-activated valve closure and detectors for determining fluid flow. The detectors have an infra-red light source and associated photo-sensor mounted near the water outlet spigot such that when a fluid flow is present at the spigot, the fluid reflects light from the infra-red light source so that the associated photo-sensor provides an output signal. A differential amplifier compares the photo-sensor output signal with a constant to determine a water run condition. Logic circuitry is connected to the comparison signal output to provide a timer actuation. The timer measures and displays the time interval between a valve closure and subsequent termination of flow at a spigot. The apparatus may be embodied as a hand-held or stationary unit.

26 Claims, 3 Drawing Sheets

WATER RUN-ON TIMER

BACKGROUND OF THE INVENTION

The present invention relates to test equipment and more particularly to a water run-on timer for use in association with appliances, such as refrigerators with water dispensers.

Several types of refrigerators in the marketplace have water and ice dispensers in their front doors. Commonly, these water dispensers are activated by placing a glass against a lever which activates a remote valve. Once the valve is opened, water is transported to a glass placed underneath a spigot in the door of the refrigerator. In order to stop the flow of water, the glass is pulled away from the lever which controls a solenoid on the valve to shut off the supply of water so that water does not continue to pour forth from the spigot. Since a water dispenser that operates improperly could cause spillage and inconvenience to a user, a manufacturing test device is needed to verify that the valve and shut-off system operate properly. The main criterion for proper operation is that the water flowing from the spigot stops shortly after the lever activates the valve to shut off water flowing to the spigot. Thus, a testing device is needed to verify proper operation of a water dispenser in a refrigerator.

U.S. Pat. No. 5,166,667 relates to an electro-optic sensor to sense the flow of liquid. This patent discloses a liquid dispenser in which drops are scanned by an electro-optic sensor. However, the patent does not disclose using an infra-red spectrum sensor to accomplish this task.

U.S. Pat. No. 5,144,977 relates to a magnetic proximity sensor which indicates if a valve is energized or not to detect flow. However, the patent does not disclose the bipolar magnetic flux sensor alone or in combination with an optical sensor.

SUMMARY OF THE INVENTION

The present invention provides an effective solution for testing water run-on in a refrigerator having a water dispenser. The present invention provides a water run-on timer to measure the time between the shut-off of a water inlet valve and the end of the water flow at an outlet spigot on the refrigerator. A bi-polar magnetic flux sensor is attached directly to the water inlet valve and is capable of signaling when the water inlet valve is energized or de-energized. An infra-red emitter and detector pair is placed in the vicinity of the water outlet spigot to indicate when water is flowing. Further, a timer device measures and displays the time interval between the valve shut-off and the termination of water outlet flow.

The present invention provides an apparatus for measuring and displaying a time interval between a valve closure and a subsequent termination of a flow at a spigot. The apparatus has a voltage supply, magnetic sensor means coupled to a flow-regulating valve for providing a signal indicative of a solenoid-activated valve closure, means for detecting a fluid flow, the means having an infra-red light source and associated photo-sensor mounted near the spigot such that when a fluid flow is present at the spigot, the fluid flow reflects light from the infra-red light source so that the associated photo-sensor provides an output signal, differential amplifier means for comparing the photo-sensor output signal with a constant to determine of the presence of a water run condition and for providing a comparison signal output, logic circuit means connected to the comparison signal output of the differential amplifier means and being responsive thereto for providing a timer actuation at an output signal and timer means for timing and displaying the time interval, the timer means being connected to the output of the logic circuit means and being actuated by the timer actuation signal.

DETAILED DESCRIPTION OF THE PREFERRED EMBODIMENTS

The present invention provides a testing apparatus for timing the water run-on in a refrigerator having a water dispenser. The water run-on timer of the present invention is used to measure the time between a shut-off of a water inlet valve in the refrigerator and the end of the water flow at a spigot of the water dispenser. A bi-polar magnetic flux sensor is attached directly to the water inlet valve and is capable of signaling when the water inlet valve is energized or de-energized. Also, an infra-red emitter and detector pair is placed in the vicinity of the water outlet spigot to indicate when water is flowing. A timer device of the present invention measures and displays time intervals between the valve shut-off and the termination of the water outlet flow from the spigot. In addition, since this is a piece of test apparatus, a cycle counter is also provided to determine and indicate the number of trials performed.

Figure 1:
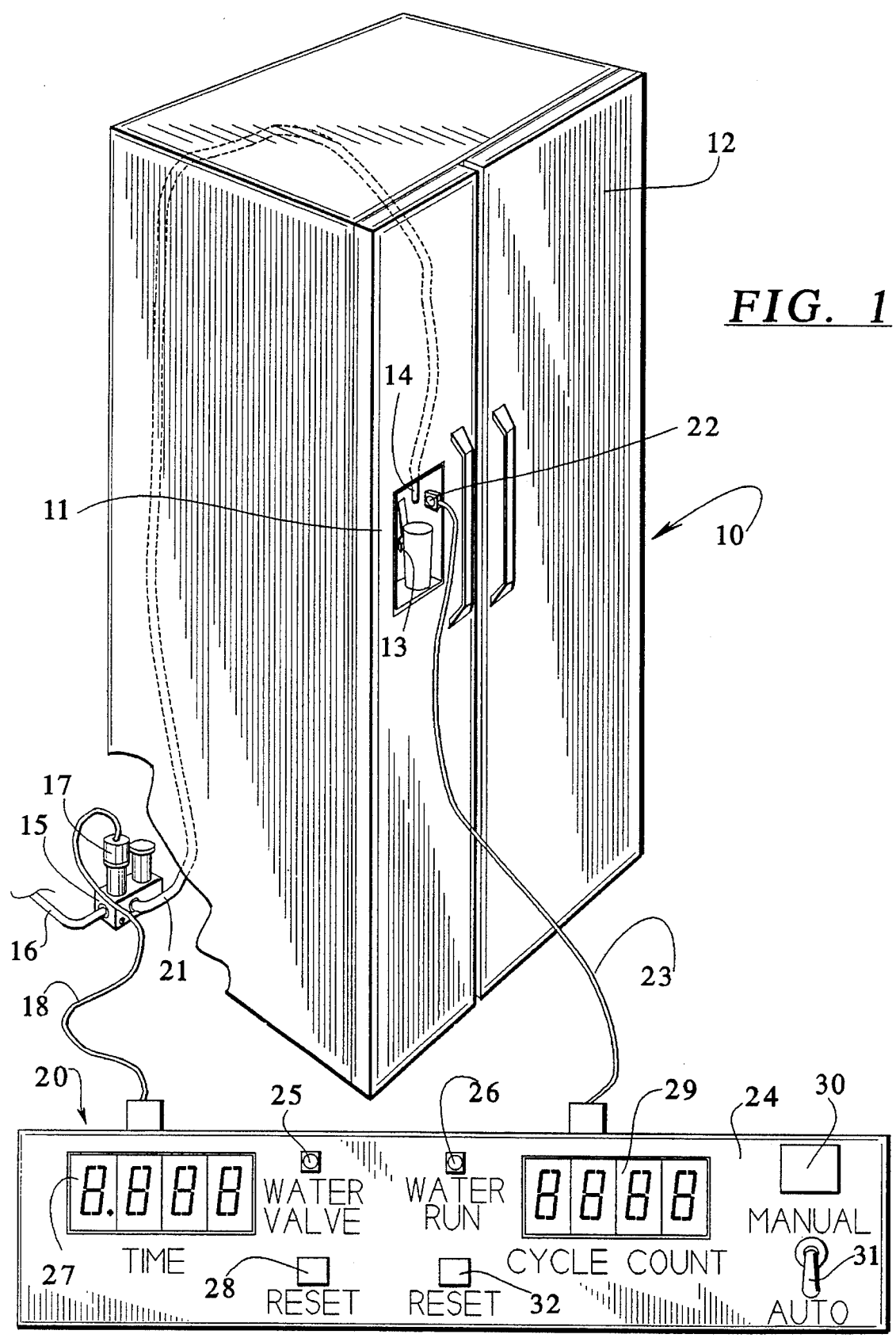
FIG. 1 is a perspective view of a refrigerator with a water dispenser in which a test device embodying the principles of the present invention could be utilized.

Referring now to the drawings, FIG. 1 illustrates a perspective view of a refrigerator having a water dispenser in which the testing apparatus embodying principles of the present invention could be utilized. A refrigerator 10 is shown with a water dispenser 11 in a door 12 of the refrigerator 10. The water dispenser 11 has an activating lever 13 and a spigot 14 for dispensing the water into a cup. The refrigerator 10 also has a water inlet valve 15 for controlling the water from a water supply line 16. A water valve sensor 17 is connected to the water inlet valve 15 for sensing the energizing and de-energizing of a solenoid to regulate flow in the water inlet valve 15. This water valve sensor 17 is preferably a bi-polar magnetic flux sensor and is connected via a control cable 18 to the testing apparatus 20.

When the valve 15 is open, water is able to flow from the water supply line 16 through the valve 15 and travel through a water hose 21 where it reaches the water dispenser spigot 14. Positioned in the proximity of the water spigot 14 is a water run detector 22. In an embodiment, the water run detector 22 is preferably an infra-red emitter and detector pair. The water run detector 22 will be described further below. In like manner to the water valve sensor 17, the water run sensor 22 is also connected to the testing apparatus 20 via a control cable 23.

In the embodiment illustrated in FIG. 1, the testing apparatus 20 has a face plate 24. A water valve indicator 25 and a water run indicator 26 are shown on the face plate 24 of the testing apparatus 20. These indicators 25, 26 are preferably LEDs that are illuminated when the appropriate sensory inputs are provided to the testing apparatus 20.

Further illustrated on the face plate 24 of the testing apparatus 20 is a time counter display 27. The time counter display 27 provides, in an embodiment, a display having increments of one one-thousandth of a second for measuring and displaying the time interval between the water inlet valve 15 shut-off and the end of the water flow at the spigot 14 of the refrigerator 10. The time counter display 27 is also provided with a reset button 28.

In addition, the testing apparatus 20 has a cycle counter 29 for displaying the number of cycles or trials tested with the testing apparatus 20. Also illustrated on the face plate 24 of the testing apparatus 20 are two switches. The first is a manual switch 30 and the second is an automatic switch 31. The operation of these two switches 30, 31 will be described further below. The cycle counter 29 is also provided with a reset button 32. Contained within the testing apparatus 20 are many of the components shown in FIG. 2.

In addition, since the water may be a flow or a repeated drip, a set of switches are provided to accommodate a potential false reading resulting from a drip condition. In normal testing operations, the automatic switch 31, which is a toggle switch, is used to enable the testing apparatus. However, the momentary manual switch 30 may also be used. The manual switch 30 is depressed by the user during the testing operation. Thus, when the flow is a repeated dripping, the user can hold down the manual switch 30 during the testing and then release the switch when the dripping subsides. In this manner, the time interval between the water valve sensor sensing a closure of the water valve and the cessation of the water flowing from the spigot is timed and displayed.

Figure 2:
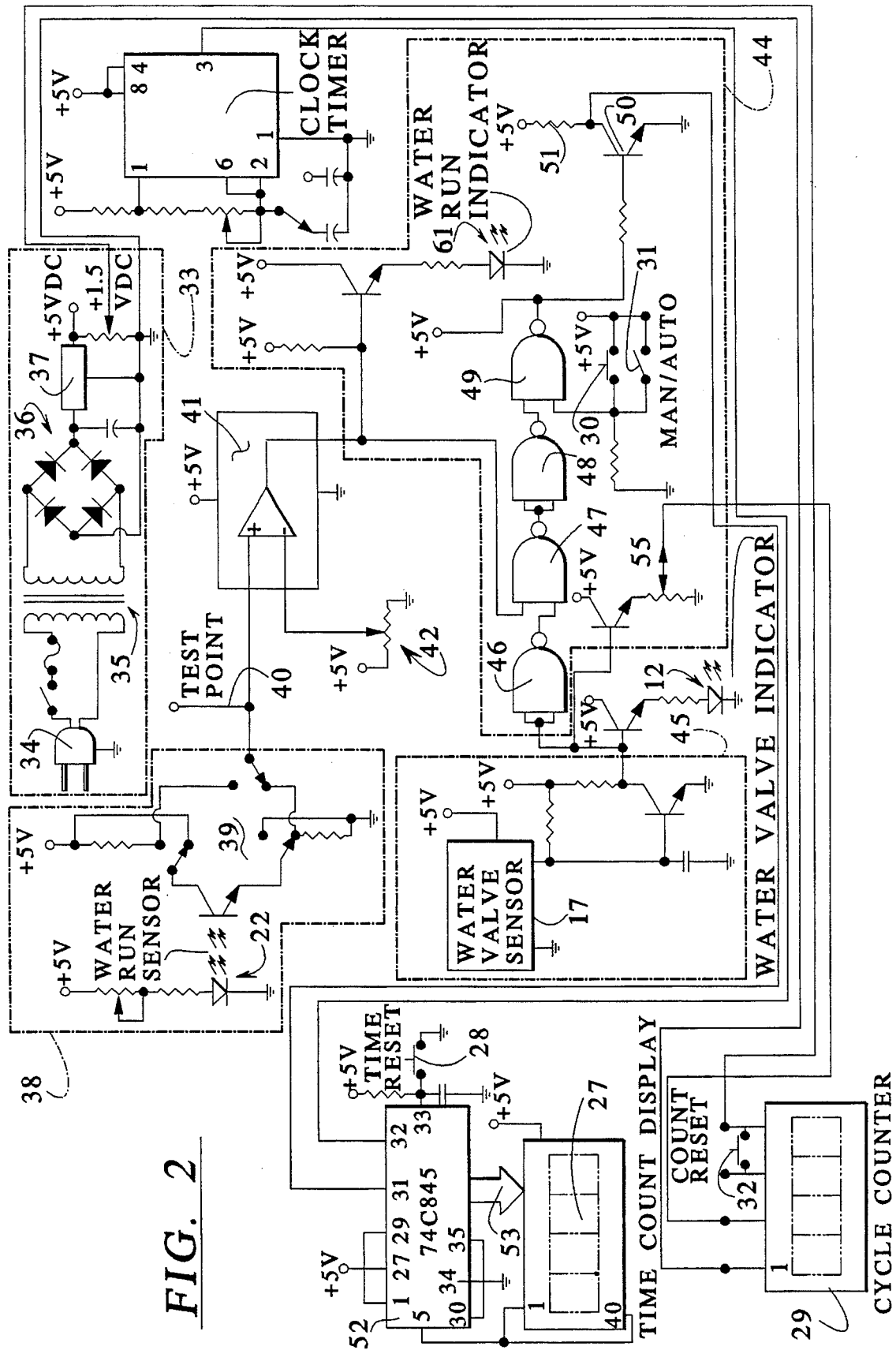
FIG. 2 is a schematic diagram of the present invention.

Referring specifically to the schematic of FIG. 2, a voltage supply means 33 comprising primarily a grounded power plug 34, a transformer 35, a bridge rectifier 36 and a voltage regulator 37 is illustrated. The voltage supply means 33 provides DC voltages of +5 VDC and +1.5 VDC for operating various electronic components of the present invention.

Also illustrated in FIG. 2 is a water run sensor means 38 that primarily comprises the water run sensor 22 and a switch 39 having associated circuitry. In an embodiment, the water run sensor 22 is an infra-red emitter and detector pair as shown in FIG. 2. There are two types of infra-red sensors available to use for water sensing: reflective and passive. Thus, the switch 39 and its supporting circuitry are included in the present invention to support both types of sensors. In the embodiment illustrated in FIG. 2, the reflective-type sensor and the appropriate switch positions therefor are illustrated. Reflective-type water run sensors operate by reflecting the infra-red emitter light off the water stream emerging from the spigot 14 (see FIG. 1).

The water run sensor means 38 produces an output signal which is present at a test point 40. This output signal is also fed into the + input of a comparator means 41. The comparator means 41 is preferably a differential amplifier means. The − input of the comparator means 41 has a constant voltage applied to it that is also adjustable by a sensitivity means 42 connected thereto. The sensitivity means 42 is provided to change the voltage constant which is input into the comparator means 41 to accommodate a variety of sensors available, i.e. passive and reflective sensors.

The output signal present at test point 40, which is the output of the water run sensor means 38, is fed into the + input of the comparator 41 as mentioned above. This output signal from the water run sensor means 38 is then compared to the voltage constant that is present at the − input of the comparator means 41. A resulting logic level output of the comparator means 41 is then fed into a logic circuit 44 to determinate whether a water run-on condition is present.

A water valve sensor means 45 comprising the water valve 17 and associated circuitry also produces an output signal that is fed into both inputs of a first NAND gate 46 that is part of the logic circuit 44. The output of the first NAND gate 46 is fed into a second NAND gate 47 while the other input of the second NAND gate 47 is the output of the comparator means 41. The output of the second NAND gate is fed into both inputs of a third NAND gate 48 and the output of the third NAND gate 48 is fed into one of the inputs of a fourth NAND gate 49.

In addition, the manual switch 30 and the automatic switch 31 shown in FIG. 1 on the face plate 24 of the testing apparatus 20 are also schematically illustrated in FIG. 2. In FIG. 2, the manual switch 30 is a push-button type, whereas the automatic switch 31 is a toggle switch. When either of these switches 30,31 is activated, the +5 VDC is connected to the second input of the fourth NAND gate 49. Also, when either of the switches is on, the sensory inputs from the sensors 17, 22 control the timer 27.

The output of the fourth NAND gate 49 is fed to a transistor 50 with a pull-up resistor 51 connected to the +5 VDC. An output signal from this transistor-resistor pair 50, 51 is connected to an input, for example, input 31, of a time counter 52 to enable the time counter 52 to measure the time interval under test. For example, the counter shown is a 74C945 type counter/driver with an LCD output manufactured as an MM74C945 by National Semiconductor Corp. of Santa Clara, Calif. However, it is obvious to those skilled in the art that other counters are available and would also work for the purposes herein.

The time counter 52 also generates segment data which is used to produce the time count display 27. To this end, the segment data is transferred from the time counter 52 to the time count display 27 via a symbolic connection 53 which enables the decimal point in the time count display 27. As illustrated, the embodiment shows a time count display 27 providing a read-out in seconds with one one-thousandth of a second increments.

In addition to the above operations, the water valve sensor means 45 also produces an output which is fed into the logic circuit 44. An output 55 thereof is connected to the cycle counter 29. This output 55 enables the cycle counter 29 and actuates it so that it counts each time a test is performed with the testing apparatus 20.

Thus, the cycle counter 29 is activated by the water valve sensor. The cycle counter 29 also has a reset 32 for zeroing out the count display.

Additionally, the time reset button 28 and the cycle counter reset button 32 are also illustrated. They perform the similar functions of zeroing the time count display 27 and the cycle counter display 29, respectively.

Figure 3:
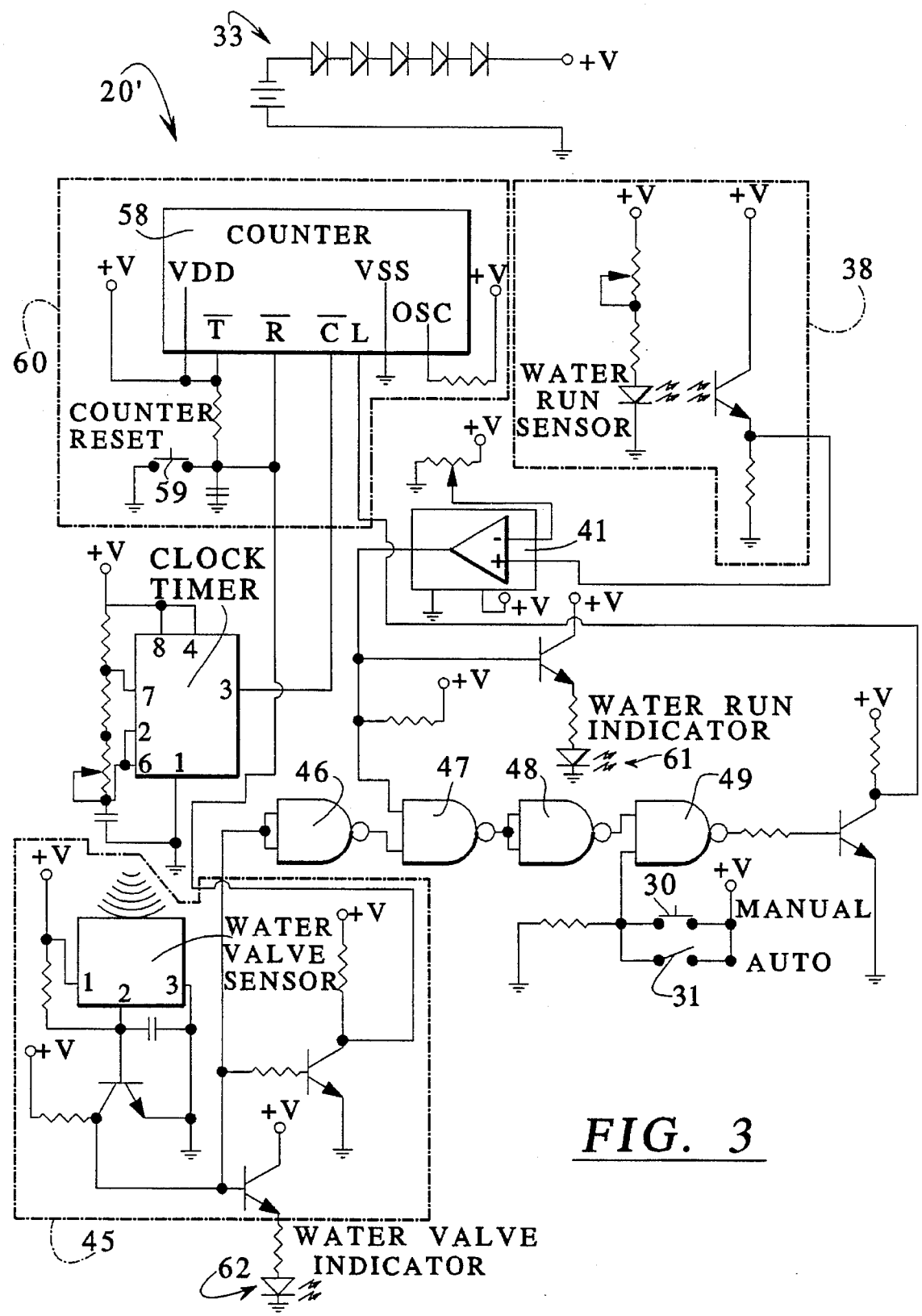
FIG. 3 is a schematic diagram of another embodiment of the present invention.

A further embodiment of the testing apparatus 20' is illustrated in FIG. 3 wherein like numerals designate like elements. For example, the voltage supply means 33 in FIG. 3, while also providing a voltage V which is used at several locations in the circuitry of the invention, is embodied using battery power instead of an AC outlet 34 with a rectifier 36 as in the embodiment shown in FIG. 2. Thus, DC voltages are provided by batteries instead of converting AC voltages to DC voltages. The embodiment illustrated in FIG. 3 is also better suited for embodying the testing apparatus 20' as a portable, hand-held unit. For example, battery power is advantageous since it renders power cords unnecessary. Also in this embodiment a different timer/display is used than the timer 52 and display 27 shown in FIG. 2. Specifically, a timer/display counter 58 is shown in FIG. 3. The timer/display 58 is provided with a reset 59 and associated circuitry comprise the timer means 60 shown in FIG. 3.

Also illustrated in FIG. 3 is the water run sensor means 38 which is similar to that shown in FIG. 2. In like fashion to the embodiment illustrated in FIG. 2, the water run sensor means 38 of FIG. 3 has an output which is fed into the + input of the comparator means 41. The operation of the comparator means 41 is similar to that discussed above.

A water run indicator 61 is also illustrated in FIG. 3. The purpose of the water run indicator 61 is to provide a visual indication to a user that the water run sensor means 38 is sensing a flow of water at the spigot 14.

Also illustrated in FIG. 3 is the water valve sensor means 45 which senses the closure of the water inlet valve 15. A water valve indicator 62 is also shown which indicates to the user when the water valve 15 is energized.

The operation of the testing apparatus 20' is similar to that of the testing apparatus 20 of FIG. 2 described above. Thus, the basic operation of the testing apparatus 20' in general terms without using reference numbers is as follows. A reflective infra-red emitter and detector is provided to sense a flow of water out of the spigot of a refrigerator having a water dispenser. The output signal of the water run detector is compared to a constant in the comparator means. The constant is adjustable however, by using a sensitivity adjustment means. A determination is then made in the comparator means as to whether the water is on or off. This determination is sent to logic circuitry which enables the timer to begin timing the interval when the water is on. This timer is also provided with a reset, which is used to zero out the timer.

In addition, the present invention has a water valve sensor which is preferably a bi-polar magnetic flux sensor which mounts directly to the top of the water valve. The output of the water valve sensor is a logic level signal with response times capable of 100 kHz so that a 120 Hz signal is measured very accurately. The highest attainable accuracy possible in dealing with a 120 Hz signal is +/−8.333 milli-seconds, which is the number given as the total circuit accuracy.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The embodiments of the invention in which an exclusive property or privilege is claimed are defined as follows:

1. An apparatus for measuring and displaying a time interval between a valve shut-off controlling a liquid flow and a subsequent cessation of the liquid flow at a spigot, comprising:

sensing means for detecting when a valve is closed and for providing a representative signal output therefor;

means for detecting a fluid flow and for providing a representative signal output therefor; and means for measuring and displaying a time interval between said signal output of said sensing means and said signal output of said means for detecting a fluid flow.

2. The apparatus of claim 1, wherein said sensing means for detecting when a valve is closed is a bi-polar magnetic flux sensor.

3. The apparatus of claim 1, wherein said means for detecting a fluid flow and for providing a representative signal output therefor is an infra-red emitter and detector pair.

4. The apparatus of claim 1, further comprising a reset for said sensing means for detecting when a valve is closed.

5. The apparatus of claim 1, further comprising a reset for said means for measuring and displaying said time interval between said signal outputs.

6. The apparatus of claim 1, wherein said sensing means for detecting when a valve is closed is a bi-polar magnetic flux sensor attached directly to a water inlet valve solenoid.

7. The apparatus of claim 6, wherein said bi-polar magnetic flux sensor is further defined by having means for signaling when said water inlet valve is closed.

8. The apparatus of claim 1, wherein said means for measuring and displaying said time interval between said signal outputs is a visual display of said time interval.

9. The apparatus of claim 8, wherein said means for measuring and displaying said time interval between said signal outputs further comprises a reset means for zeroing said visual display.

10. The apparatus of claim 1 further comprising a counter means for measuring and displaying a number of timing cycles performed.

11. The apparatus of claim 1, wherein said means for measuring and displaying a time interval comprise a comparator for comparing said representative signal output with a constant to determine the presence of a water run-on condition and for providing a comparison signal output.

12. The apparatus of claim 11, wherein the means for measuring and displaying a time interval further comprise a logic circuit connected to the said comparison signal put and being responsive thereto for providing a timer actuation at an output signal.

13. The apparatus of claim 12, wherein said means for measuring and displaying a time interval further comprise a timer for timing and displaying the time interval said timer being connected to the output of the logic circuit and being actuated by the timer actuation signal.

14. An apparatus for measuring and displaying a time interval between a valve closure and a subsequent termination of a flow at a spigot, comprising:

a voltage supply;

magnetic sensor means coupled to a flow-regulating valve for providing a signal indicative of a solenoid-activated valve closure;

means for detecting a fluid flow, said means having an infra-red light source and associated photo-sensor mounted near a spigot such that when a fluid flow is present at said spigot, said fluid flow reflects light from said infra-red light source so that said associated photo-sensor provides an output signal;

differential amplifier means for comparing said photo-sensor output signal with a constant to determine the presence of a water run condition and for providing a comparison signal output;

logic circuit means connected to said comparison signal output of said differential amplifier means and being responsive thereto for providing a timer actuation at an output signal; and timer means for timing and displaying the time interval said timer means being connected to said output of said logic circuit means and being actuated by said timer actuation signal.

15. The apparatus of claim 14, further comprising a manual momentary switch to control said photo-sensor signal output.

16. The apparatus of claim 14, wherein said differential amplifier means further comprises a sensitivity adjustment means for accommodating a variety of sensors.

17. The apparatus of claim 16, wherein said sensitivity adjustment means is a potentiometer and a switch having associated circuitry.

18. The apparatus of claim 14, further comprising an automatic toggle switch to control said photo-sensor signal output.

19. The apparatus of claim 14, wherein said means for detecting a fluid flow having said infra-red light source and said associated photo-sensor includes a passive photo-sensor.

20. The apparatus of claim 14, wherein said means for detecting a fluid flow having said infra-red light source and said associated photo-sensors includes a reflective photo sensor.

21. The apparatus of claim 14, wherein said voltage supply is a battery-powered voltage supply.

22. The apparatus of claim 14, wherein said voltage supply is an alternating current voltage supply having means for providing direct current voltages.

23. The apparatus of claim 14, wherein said timer means further comprises a reset.

24. The apparatus of claim 14, further comprising counter means for providing an output indicative of a number of cycles performed.

25. The apparatus of claim 24, wherein said counter means further comprises a reset.

26. The apparatus of claim 24, wherein said output is a display of said logic circuit means.

* * * * *